United States Patent Office 3,718,546
Patented Feb. 27, 1973

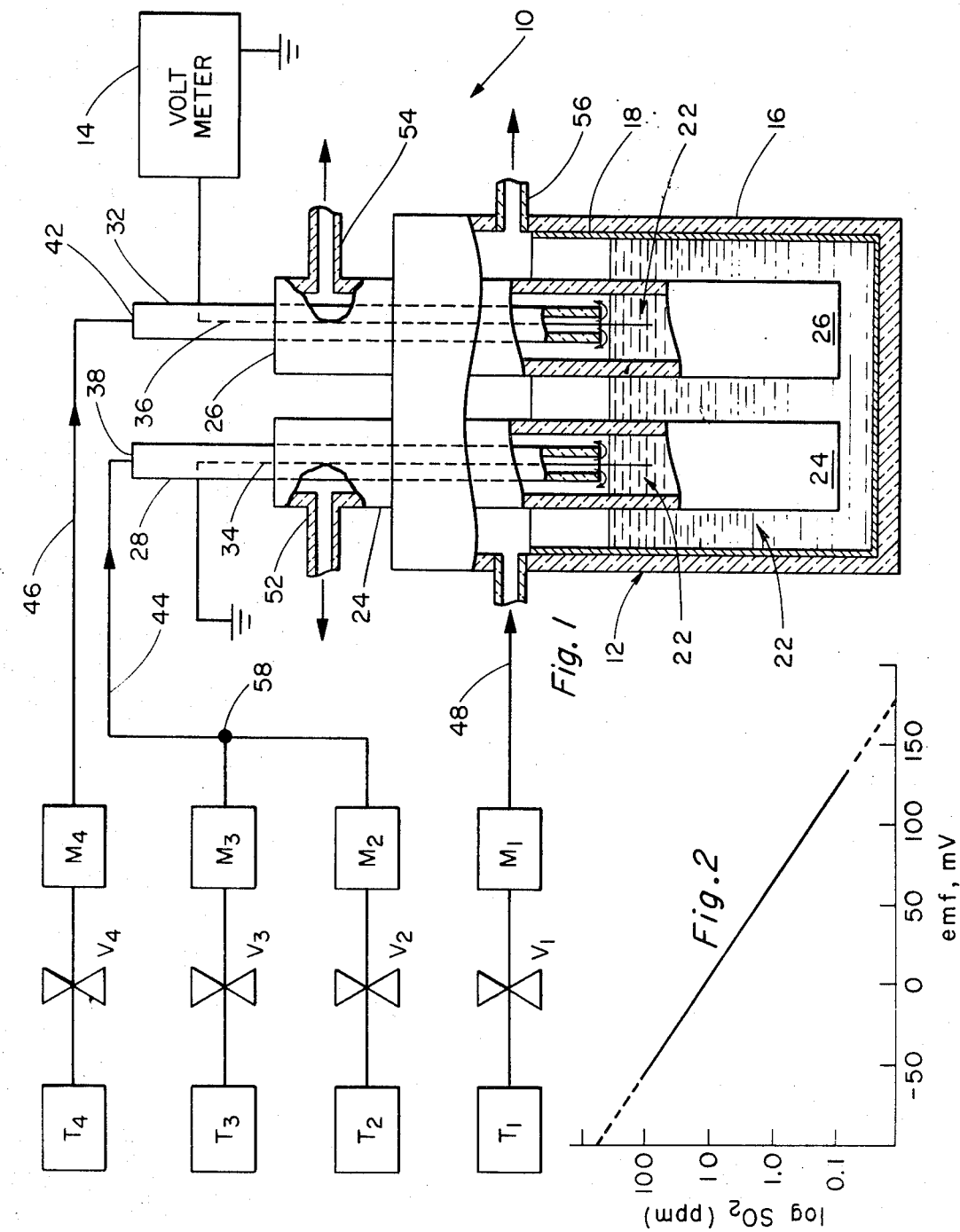

3,718,546
SULFUR OXIDE ACTIVITY MEASUREMENT
Francis J. Salzano, Patchogue, Andrew M. Davis, Blue Point, Hugh S. Isaacs, Shoreham, and Leonard Newman, Smithtown, N.Y., assignors to the United States of America as represented by the United States Atomic Energy Commission
Filed Dec. 9, 1971, Ser. No. 206,352
Int. Cl. G01n 27/46
U.S. Cl. 204—1 T
10 Claims

ABSTRACT OF THE DISCLOSURE

A sulfur oxide activity meter for measuring directly in an electrochemical cell the changes in $SO_2$ activity in a sample gas being supplied continuously to the cell. The electrolyte consists of molten fused $Li_2SO_4$, $K_2SO_4$ and $Na_2SO_4$. The sample gas forms part of one electrode while a reference gas having a fixed concentration of $SO_2$ forms part of the other electrode.

SOURCE OF THE INVENTION

The invention described herein was made in the course of, or under a contract with the U.S. Atomic Energy Commission.

BACKGROUND OF THE INVENTION

During the past few years there has been increasing concern over the presence of polluting products being discharged into our environment with special attention being directed to those products which pollute our atmosphere.

Among the polluting products of particular concern is $SO_2$ which is discharged into the atmosphere as part of the effluent from power plants and certain other industrial processes. This gaseous compound is considered to be especially harmful to people with respiratory ailments and those at an advanced age. Also, $SO_2$ is detrimental to the finishes of home furnishings and other articles of esthetic value.

Part of the overall problem of eliminating $SO_2$ from effluents being discharged into the atmosphere is that of monitoring the air for the presence of this pollutant and the extent of its presence. Heretofore, air has been monitored for its $SO_2$ content using several methods including one known as flame ionization and another involving that of bubbling the air through deionized water, the presence of $SO_2$ increasing the conductivity of the water. Neither of these techniques as well as others which have been used are satisfactory. That is, the presence of other ingredients, such as $N_2O$ and $CO_2$, in usual amounts, tend to hinder or at least complicate results. In addition, these methods rely on sophisticated techniques and are relatively expensive.

SUMMARY OF THE INVENTION

The present invention overcomes many of the disadvantages of previous ways of measuring the $SO_2$ content of an oxygen bearing gas such as air or oxygen. In accordance with one embodiment of this invention the concentration of $SO_2$ is measured in an electrochemical cell having a fused salt electrolyte, provision to expose reference and sample oxygen bearing electrodes to the electrolyte, and one or more membranes porous to a cation common to the electrolyte to isolate within the electrolyte the reference and sample gas electrodes from each other. The reference gas contains a fixed amount of $SO_2$, the output EMF of the cell being a function of the difference in activities between the $SO_2$ in the reference gas and that in the sample undergoing testing. Properly calibrated, the device will indicate directly the $SO_2$ concentration in the sample gas.

In accordance with another embodiment of this invention, there is provided a method for the measurement of the $SO_2$ gas in a sample oxygen bearing gas consisting of establishing a first electrode by contacting a first electrically conductive element with an electrolyte consisting of two or more fused sulfate salts and exposing the surface of said electrolyte in the region of said first element to a flow of said sample gas, establishing a second electrode by contacting a second electrically conductive element with said electrolyte and exposing the surface of said electrolyte in the region of said second element to a flow of a reference oxygen bearing gas containing a fixed amount of $SO_2$, separating the two aforesaid regions of said electrolyte by a membrane porous to a cation common to said electrolyte, and determining the EMF developed which correlates to the $SO_2$ content of the sample gas.

The electrochemical cell and the method of this invention are ideally suited for continuous measurement. That is, as the $SO_2$ concentration in the unknown sample changes with time the EMF varies in accordance therewith so that a trace of the EMF gives a lasting record of the $SO_2$ concentration.

It is thus a principal object of this invention to provide an electrochemical approach to the measurement of $SO_2$ concentration in an oxygen bearing gas.

Other objects and advantages of this invention will hereinafter become obvious from the following description of preferred embodiments of this invention.

DESCRIPTION OF THE DRAWING

FIG. 1 is a view illustrating in a practically schematic manner a preferred embodiment of this invention; and FIG. 2 is a typical calibration curve for the embodiment of FIG. 1 showing $SO_2$ activity in air.

DESCRIPTION OF THE PREFERRED EMBODIMENT

Referring to FIG. 1, sulfur oxide activity meter 10 consists of an electrochemical cell 12 and a voltmeter 14 to display and/or record the voltage output of cell 12.

Cell 12 consists of a closed cylindrical container 16 containing a gold liner 18 to hold electrolyte 22. Immersed in electrolyte 22 through the top wall of container 16 are closed reference and sample thimbles 24 and 26, respectively. Thimbles 24 and 26 both contain electrolyte 22 as illustrated.

Extending into reference and sample thimbles 24 and 26 are a pair of gas supply tubes 28 and 32, respectively, carrying reference and sample electrically conductive contacts 34 and 36, respectively. Tubes 28 and 32 are open at the bottom, the lower ends of contacts 34 and 36 extending into electrolyte 22. Contact 34 extends out of near the upper end of tube 38 and is grounded electrically. Contact 36 extends out of tube 32 to voltmeter 14. Voltmeter 14 indicates the EMF developed by cell 12.

The upper end of reference tube 28 is supplied by way of line 44 with the reference gas. As will be more particularly described below, the reference gas is an oxygen bearing gas (such as $O_2$ or air) containing a fixed or known concentration of $SO_2$.

Sample tube 32 is supplied at its upper end by way of line 46 with the sample oxygen bearing gas containing some unknown concentration of $SO_2$ to be measured and monitored. The sample gas could be, for example, $O_2$ or air which is to be monitored for the presence of $SO_2$. Both the sample and reference gases, however, should for the purpose of improving accuracy be the same except for the varying $SO_2$ in the sample gas. It has been discovered that if there are constituents present which could alter the results, the effects tend to cancel out when both the reference and sample gases have substantially the same interfering values.

Container 16 is provided with a source of an inert gas such as helium by way of line 48. Tubes 28 and 32 and container 16 are provided with outlet lines 52, 54 and 56, respectively, to carry away the various gases flowing through cell 12 as just described.

In order to supply gases to tubes 28 and 32 and container 16, the illustrated arrangement may be employed. Helium may originate from a tank $T_1$, controlled by a valve $V_1$, and its rate of flow into line 48 measured by a flow meter $M_1$. The reference gas, which is an oxygen containing gas having a known or fixed concentration of $SO_2$, can be supplied in a somewhat similar fashion. That is, the $SO_2$ could originate from a tank $T_2$, controlled by a valve $V_2$, and its rate of flow measured by a flow meter $M_2$. The oxygen bearing gas, which could be either pure $O_2$ or with its $SO_2$ content removed or known, can be supplied from a tank or source $T_3$, flow regulated by a valve $V_3$, and flow rate measured by flow meter $M_3$. The gases from sources $T_2$ and $T_3$ are mixed at 58 where the reference gas enters line 44. From the information obtained by flow meters $M_2$ and $M_3$ the exact content of the reference gas as to $SO_2$ may thus be known if desired.

The sample gas, whose $SO_2$ content is to be measured, can be accumulated (if desired) in a tank or source $T_4$ and then similarly supplied by way of valve $V_4$ and flow meter $M_4$ to line 46 and sample electrode 32. Tanks $T_1$–$T_4$ are pressurized sufficiently to insure flow through the system. In the event storage tanks are not used, then pumps would be required.

Electrolyte 22 consists of fused sulfate salts, such as a combination of $K_2SO_4$, $Li_2SO_4$, and $Na_2SO_4$. While the use of a single sulfate salt is possible the high melting point of the individual salts make them difficult or impossible to use in such a cell. Two or more of these salts are combined in such proportions as to be molten in the range of about 500° C. to 800° C. which is within the acceptable range of the other materials in cell 12.

The material selected for at least some portion of thimbles 24 and 26 immersed in electrolyte 22 should be one that is inert in the environment except that is is permeable to at least one of the cations present in the melt. Thus, in a melt involving at least two of the above mentioned sulfate salts, quartz is satisfactory, being highly permeable to the sodium cation. While quartz was selected for use in making container 10 and tubes 28 and 32, any material inert in the described environment would be satisfactory. Liner 18 was made from gold to protect the quartz of container 16.

In the operation of the apparatus shown in FIG. 1, both the reference and sample gases advantageously should be the same for best results, with the $SO_2$ content of the reference gas fixed, and the $SO_2$ content of the sample gas variable to be measured. In this way, as already noted, the adverse effects of other constituents present tend to be canceled out in the cell. It is also desirable, to the extent practicable, to utilize a reference gas in which the $SO_2$ content is in the same order of magnitude (e.g., 10% to 1000%) expected to be found in the sample gas. Thus, if atmospheric air is being tested, air from the same locality and about the same time would be selected and stored in use as the reference gas. It is not necessary to know the $SO_2$ content of the reference gas if the instrument can be calibrated prior to its use with the particular reference gas.

The following examples illustrate this invention:

EXAMPLE 1

Electrolyte 22 consisted of a molten eutectic mixture of $K_2SO_4$, $Li_2SO_4$ and $Na_2SO_4$. The eutectic mixture, with a melting temperature of 512° C. within the range of 500° C. to 800° C., consists of 3½ mol percent $K_2SO_4$, 78 mol percent $Li_2SO_4$, and 8½ mol percent $Na_2SO_4$.

Thimbles 24 and 26 were prepared from commercial grade quartz tubing.

Cell 12 and the electrolyte were heated to 700° C. at which temperature the runs were conducted. Electrolyte 22 was molten.

The gases supplied to cell 12 at ambient temperatures were substantially atmosphere pressure, the pressure being just high enough above atmospheric to obtain flow through the cell.

Oxygen was supplied to tube 28 containing a small but unknown and fixed amount of $SO_2$. In the operation of meter 10, it is not necessary to know the exact content of the $SO_2$ in the reference gas, as long as the concentration is fixed during the cell's operation. Thus, if ordinary commercial grade oxygen does not contain traces of $SO_2$, some may be added.

The sample gas, which was oxygen, whose $SO_2$ content was to be measured, was supplied to tube 32. Cell 12 was calibrated by a series of runs in which the sample gas was selected for known content of $SO_2$. It was found that there existed a linear relationship between the log of the $SO_2$ content of the sample gas and the EMF recorded on voltmeter 14.

EXAMPLE 2

A similar series of tests were conducted using the same electrolyte as in the preceding example, except that ambient air was both as the reference gas and as the sample gas. The reference gas contained 15.2 p.p.m. of $SO_2$ and flow was at the rate of 90 cm.$^3$/min. The sample gas was supplied at the rate of 275 cm.$^3$/min. Relative flow rates between the two electrodes were not found to be critical. Absolute flow rates are material in calibrating the cell. FIG. 2 illustrates the calibration curve which was developed during the course of these runs.

In the described arrangement, it should be noted that only thimbles 28 and 32 in contact with electrolyte 22 need be made from properly porous material as described, the remaining construction would be of material inactive or inert in the environment disclosed. Also, it is understood that instead of separate thimbles 28 and 32 the same result can be accomplished by a divider of proper material extending down into the electrolyte 22 within container 16.

From a series of tests run in accordance with the principles of this invention, there is some indication that $SO_2$ activity in the sample gas is measured indirectly by cell 10. That is, the activity of $SO_3$ is more directly involved and that the equilibrium between $SO_3$ and $SO_2$ established during operation of the cell provides the actual basis for the relationship indicated by meter 10. In view of the fact that $SO_3$ reacts rapidly with available moisture to form sulfuric acid which is known hazard to health, structural materials, and vegetation, it is readily apparent that the instant invention may be capable of being useful for the direct measurement of $SO_3$. Another consequence of this evident relationship is that by substituting for the inert material of the gas tubes a material which acts as a catalyst such as platinum or vanadium oxide in converting $SO_2$ to $SO_3$, it may be possible to increase the sensitivity of the instrument.

With regard to the volume of electrolyte within thimbles 24, and 26, it is advantageous to provide reservoirs within therein as small as possible.

What is claimed:

1. An electrochemical meter for indicating $SO_2$ activity in an oxygen bearing gas comprising:
   (a) means containing a molten fused electrolyte consisting of at least two sulfate salts selected from the group consisting of $Li_2SO_4$, $K_2SO_4$, and $Na_2SO_4$;
   (b) means for supplying a reference gas containing oxygen and a fixed $SO_2$ concentration to a first portion of the free surface of said electrolyte;
   (c) means for supplying a sample gas containing oxygen and some unknown concentration of $SO_2$ to a second portion of the free surface of said electrolyte;

(d) first and second electrically conductive means extending into the separate portions of said electrolyte respectively;

(e) barrier means extending into said electrolyte segregating said reference and sample gases, the conductive means and the portions of said electrolyte contacted by said gases, said barrier means made from material porous to a cation of said electrolyte; and (f) means for measuring the EMF across said conductive means for indicating $SO_2$ activity in said sample gas.

2. The meter of claim 1 in which the molten fused electrolyte has a melting temperature within the range of 500° C. to 800° C.

3. The meter of claim 2 in which the porous material is quartz.

4. The meter of claim 3 in which said barrier means consists of a pair of thimbles closed at the bottom thereof extending into said electrolyte and containing electrolyte, respective conductive means, and the supply means for said reference and sample gases.

5. The meter of claim 4 in which each of the supply means consists of an open tube extending down into one of said thimbles terminating adjacent a surface of said electrolyte so that gas flowing out of each tube flows over said surface of said electrolyte.

6. A method of measuring the $SO_2$ content of a sample oxygen bearing gas comprising the steps of:

(a) establishing a first electrode by contacting a first electrically conductive element and a flow of said sample gas with a molten electrolyte consisting of a mixture of at least two sulfate salts selected from the group consisting of $Li_2SO_4$, $K_2SO_4$, and $Na_2SO_4$ in a first region of said electrolyte;

(b) establishing a second electrode by contacting a second electrically conductive element and a flow of a reference oxygen bearing gas having a fixed concentration of $SO_2$, with said molten electrolyte in a second region;

(c) separating the first and second regions of said electrolyte by immersing membrane means which is porous to a cation of said electrolyte; and (d) determining the EMF developed across said first and second conductive elements correlative to the varying $SO_2$ concentration in said sample gas.

7. A method according to claim 6 in which the electrolyte is in the temperature range of 500° C. to 800° C.

8. A method according to claim 7 in which the electrolyte is the eutectic mixture of the aforesaid group of sulfate salts.

9. A method according to claim 8 in which the membrane is quartz.

10. The method according to claim 6 in which the reference and sample gases are substantially identical except for $SO_2$ content.

References Cited

UNITED STATES PATENTS

| | | | |
|---|---|---|---|
| 1,963,550 | 6/1934 | Greger | 136—86 E |
| 2,384,463 | 9/1945 | Gunn et al. | 136—86 R |
| 2,651,612 | 9/1953 | Haller | 204—195 R |
| 2,921,110 | 1/1960 | Crowley et al. | 136—86 A |
| 3,689,394 | 9/1972 | Davies et al. | 204—195 P |

TA-HSUNG TUNG, Primary Examiner

U.S. Cl. X.R.

204—195 R